(12) United States Patent
Titus

(10) Patent No.: US 8,368,269 B2
(45) Date of Patent: *Feb. 5, 2013

(54) ROTARY MOTOR

(75) Inventor: Larry D. Titus, Cinnaminson, NJ (US)

(73) Assignee: Larry Titus Clean Energy Technologies, Inc., Cinnaminson, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/165,833

(22) Filed: Jun. 22, 2011

(65) Prior Publication Data

US 2011/0248590 A1    Oct. 13, 2011

Related U.S. Application Data

(63) Continuation of application No. 12/534,206, filed on Aug. 3, 2009, now Pat. No. 7,969,055.

(60) Provisional application No. 61/086,599, filed on Aug. 6, 2008.

(51) Int. Cl.
*H02K 7/06* (2006.01)
*H02K 23/04* (2006.01)

(52) U.S. Cl. ........ 310/80; 310/20; 310/156.32; 310/152

(58) Field of Classification Search .................. 310/152, 310/80, 20, 46, 90.5, 75 D, 37, 266, 268, 310/156.32

See application file for complete search history.

(56) References Cited

U.S. PATENT DOCUMENTS

| | | | |
|---|---|---|---|
| 381,968 A | 5/1888 | Tesla | |
| 2,275,827 A | 3/1942 | Plensler | |
| 3,056,253 A * | 10/1962 | Beyner et al. | 368/169 |
| 3,065,253 A * | 11/1962 | Merritt, Jr. | 556/478 |
| 3,935,487 A | 1/1976 | Czerniak | |
| 4,079,278 A | 3/1978 | Luneau | |
| 4,151,431 A | 4/1979 | Johnson | |
| 4,163,165 A | 7/1979 | Purdy | |
| 4,196,365 A | 4/1980 | Presley | |
| 4,225,798 A | 9/1980 | Barrett | |
| 4,278,927 A | 7/1981 | Grohe | |
| 4,329,607 A * | 5/1982 | Rosain et al. | 310/82 |
| 4,334,164 A | 6/1982 | Yatsushiro et al. | |
| 4,358,693 A | 11/1982 | Palmer et al. | |
| 4,598,221 A | 7/1986 | Lawson et al. | |
| 5,008,578 A | 4/1991 | Pace | |
| 5,109,172 A | 4/1992 | Pace | |
| 5,510,662 A | 4/1996 | Tanimoto et al. | |
| 5,952,757 A | 9/1999 | Boyd, Jr. | |
| 6,359,359 B1 | 3/2002 | Miura et al. | |
| 6,396,180 B1 | 5/2002 | Blakesley | |
| 6,404,097 B1 | 6/2002 | Pullen | |
| 6,437,471 B1 | 8/2002 | Ogawara et al. | |
| 6,462,452 B2 | 10/2002 | Nakano et al. | |
| 6,633,105 B2 | 10/2003 | Ohnishi et al. | |

(Continued)

FOREIGN PATENT DOCUMENTS

JP    55023383    2/1980

OTHER PUBLICATIONS

Ebay auction listing for: Free Energy Perpetual Permanent Magnet Motor Plans CD, dated Feb. 26, 2008.

(Continued)

*Primary Examiner* — Quyen Leung
*Assistant Examiner* — Thomas Truong
(74) *Attorney, Agent, or Firm* — Neils Haun; Dann, Dorfman, Herrell & Skillman, P.C.

(57) ABSTRACT

The present invention relates to rotary motors in which the rotational motion of the motor is provided by the attractive (or repulsive) forces between a pair of cooperating magnets in response to tilting of the motor axle.

15 Claims, 6 Drawing Sheets

U.S. PATENT DOCUMENTS

| | | |
|---|---|---|
| 6,653,757 B2 | 11/2003 | Schlenker |
| 6,700,248 B2 | 3/2004 | Long |
| 6,781,270 B2 | 8/2004 | Long |
| 6,784,590 B2 | 8/2004 | Ohnishi et al. |
| 6,853,105 B2 | 2/2005 | Nakano et al. |
| 6,858,960 B1 | 2/2005 | Muszynski |
| 6,867,514 B2 | 3/2005 | Fecera |
| 6,876,116 B2 | 4/2005 | Nakano et al. |
| 6,906,444 B2 | 6/2005 | Hattori et al. |
| 6,930,421 B2 * | 8/2005 | Wise .............................. 310/103 |
| 6,943,475 B2 | 9/2005 | Enomoto et al. |
| 6,984,908 B2 | 1/2006 | Rinholm et al. |
| 7,282,827 B2 | 10/2007 | Futami |
| 7,342,337 B2 | 3/2008 | Wise |
| 2007/0120432 A1 | 5/2007 | Vaden et al. |

OTHER PUBLICATIONS

Ebay auction listing for: Perpetual Permanent Magnet Motor Plans CD Free Energy 2, dated Feb. 26, 2008.

* cited by examiner

ROTARY MOTOR

RELATED APPLICATIONS

The instant application is a continuation of U.S. patent application Ser. No. 12/534,206, filed on Aug. 3, 2009, now U.S. Pat. No. 7,969,055 which claims the benefit of priority of U.S. Provisional Application No. 61/086,599, filed on Aug. 6, 2008, the entire contents of which application(s) are incorporated herein by reference.

FIELD OF THE INVENTION

The present invention relates generally to rotary motors and more particularly but not exclusively to rotary motors that include two or more permanent magnets to convert angular displacement of a motor axle into rotational motion of a rotor arm about the axle.

BACKGROUND OF THE INVENTION

The efficient utilization of energy and the corresponding reduction in the use of finite natural resources, such as fossil fuels, remains an enduring problem of great import throughout the industrialized world. Among the types of devices that utilize energy, motors, and especially rotary motors, are pervasive and occupy an important place in a variety of devices, such as fans, blowers, water pumps, generators, wind or solar energy transfer systems, etc. Thus, creation of rotary motors having increased efficiency and decreased energy consumption can have a dramatic impact on the overall utilization of energy and finite natural resources. Accordingly, a need exists in the art for rotary motors of increased efficiency.

SUMMARY OF THE INVENTION

The present invention relates to rotary motors in which the rotational motion of the motor is provided at least in part by the attractive (or repulsive) forces between a pair of cooperating magnets. For example, in one configuration of the present invention, a rotary motor is provided which includes an axially magnetized ring magnet. The ring magnet may include a generally planar upper surface and a central axis extending through the center of the ring magnet perpendicular to the upper surface of the ring magnet. The motor may also include an axle having a distal end and a proximal end that may be initially disposed substantially along the central axis of the ring magnet with the distal end pivotally mounted proximate the ring magnet. A rotor arm may be rotatably mounted on the axle to extend radially outward from the longitudinal axis of the axle with the rotor arm disposed above the upper surface of the ring magnet. At least one rotor magnet may be mounted to the rotor arm at a location to permit the magnetic field of the rotor magnet to interact with the magnetic field of the ring magnet. For example, the rotor magnet may be disposed at the rotor arm at a location above the upper surface of the ring magnet, and may be oriented relative to the ring magnet to be attracted to, or repelled by, the ring magnet. Either or both of the ring and rotor magnets may comprise a permanent magnet. To induce and optionally maintain rotational motion of the rotor arm about the axle, an actuator may be disposed in mechanical communication with the proximal end of the axle. The actuator may be configured to move the proximal end of the axle out of line with the central axis to pivot the axle about the pivotally mounted distal end to tilt the axle relative to the central axis of the ring magnet, thereby inducing rotational motion of the rotor arm.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
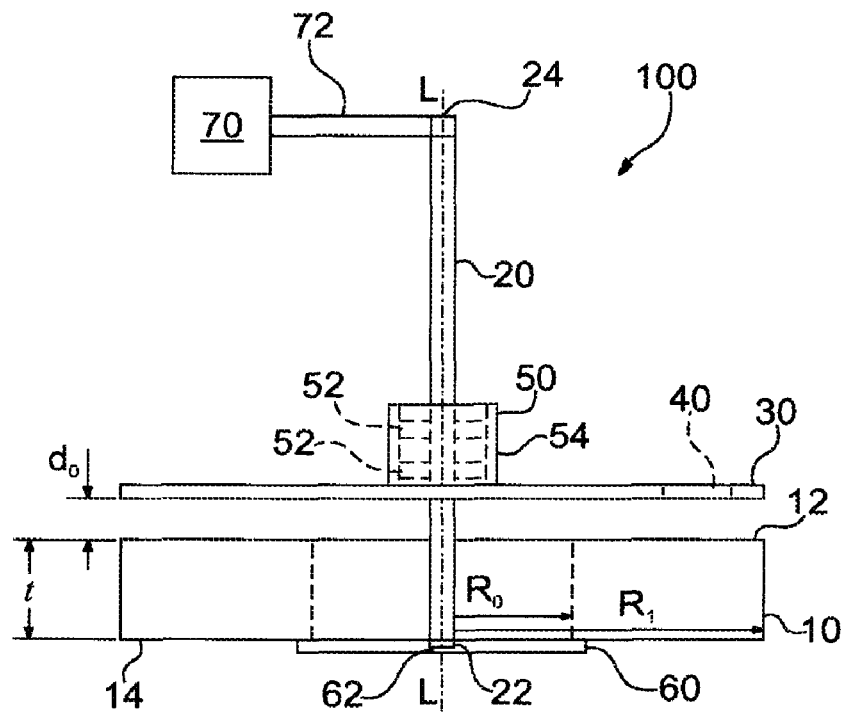
FIG. 1 schematically illustrates a side elevational view of an exemplary configuration of a rotary motor in accordance with the present invention.

Referring now to the figures, wherein like elements are numbered alike throughout, an exemplary configuration of a rotary motor in accordance with the present invention, generally designated 100, is illustrated in FIG. 1. The rotary motor 100 may include an axially magnetized permanent ring magnet 10 and an axle 20 disposed along a central axis (L) of the magnet 10 that extends through the center of the ring magnet 10. The axle has a distal end 22 that may be pivotally mounted at a location proximate the ring magnet 10 along the central axis L. A rotor arm 30 is rotatably mounted on the axle 20 to permit the rotor arm 30 to rotate about the axle 20 thereby providing the rotary action of the rotary motor 100. The rotor arm 30 may include at least one permanent rotor magnet 40, such as a disk magnet, which may be oriented to be attracted to, or repelled from, the ring magnet 10. Movement of the rotor arm 30 due to attraction or repulsion between the rotor magnet 40 and the ring magnet 10 is controlled in part by a tilt actuator 70 mechanically linked by linkage 72 to a proximal end 24 of the axle 20. By controlling the movement of the distal end 24 of the axle 20, movement of the rotor magnet 40 relative to the ring magnet 10 may also be controlled. Specifically, by moving the proximal end 24 of the axle 20 relative to a pivot point at the distal end 22, the axle 20 may be tilted so the rotor arm 30 is no longer parallel to the upper surface 12 of the ring magnet 10, creating a location where the rotor arm 30 will be closest to the ring magnet 10. For the case where the rotor magnet 40 is oriented so that it is attracted to the ring magnet 10, attraction between the rotor magnet 40 and the ring magnet 10 will cause the rotor arm 30 to rotate towards the location where the rotor arm 30 is closest to the ring magnet 10. Hence, tilting the axle 20 combined with the attractive force between the rotor magnet 40 and the ring magnet 10 can effect rotation of the rotor arm 30 about the axle 20. As further explained below in more detail, continued tilting of the axle 20 back and forth, coupled with the attractive force between the rotor magnet 40 and the ring magnet 10, can create sustained rotation of the rotor arm 30 about the axle 20.

Figure 2:
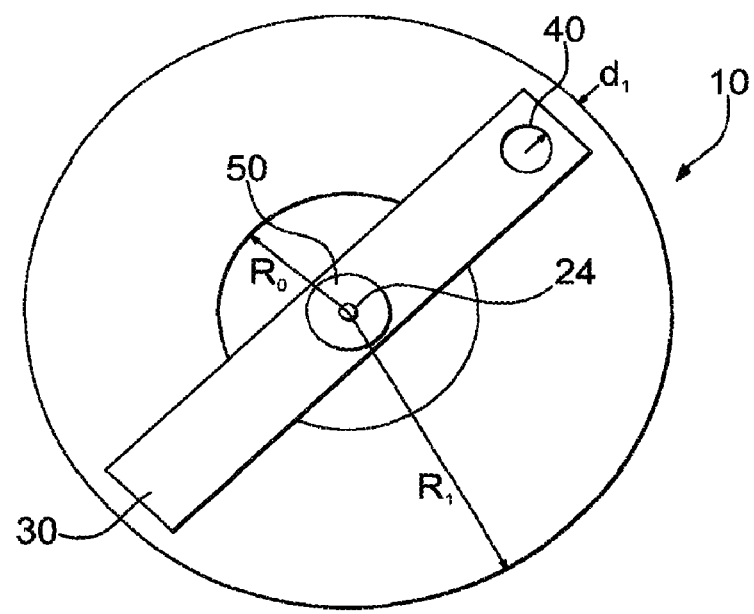
FIG. 2 schematically illustrates a top view of the rotary motor of FIG. 1.

Turning then to FIG. 1 in more detail, the axially magnetized ring magnet 10 may include a generally planar upper surface 12 and an opposing generally planar lower surface 14 each of which is parallel to one another. The ring magnet 10 may include an inner radius, $R_0$, corresponding to the radius of a central aperture of the ring magnet 10, and an outer radius, $R_1$, to provide a disk-shaped magnet having an annular or ring shape of thickness t, FIGS. 1 and 2. In reference to the ring magnet 10, the term "axially magnetized" is defined herein to mean that the magnetic poles of opposite polarity are located at the opposing upper and lower surfaces 12, 14 of the ring magnet 10, respectively. That is, the North or positive pole of the ring magnet 10 may be disposed at the upper surface 12, and the opposite polarity South or negative pole may be disposed at the lower surface 14. The ring magnet 10 also includes a central axis L located at the rotational center of the ring magnet 10 and oriented perpendicular to the upper surface 12 of the ring magnet 10. The ring magnet 10 may comprise materials of any suitable composition, such as samarium-cobalt, aluminum-nickel-cobalt, neodymium-iron-boron, and/or ceramic or ferrous materials. Alternatively, the ring magnet 10 may be an electromagnet.

The rotary motor 100 also includes an axle 20 having distal and proximal ends 22, 24 that may be disposed initially along the central axis L of the ring magnet 10. The distal end 22 of the ring magnet 10 may be pivotally mounted proximate the ring magnet 10 so the axle 20 may be tilted out of line with the central axis L of the ring magnet 10 while maintaining the distal end 22 of the axle 20 at its original location along the central axis L of the ring magnet 10. For example, the distal end 22 of the axle 20 may be disposed proximate the lower surface 14 of the ring magnet 10. In this regard, a baseplate 60 may be provided at the lower surface 14 of the ring magnet 10 in fixed location relative thereto to provide a pivot point 62 at which the distal end 22 of the axle 20 may be mounted. Alternatively, the baseplate 60 may be provided at the upper surface 12 of the ring magnet 10. However, in either location, the baseplate 60 should be constructed of a material that does not interfere with the magnetic properties of the ring magnet 10. For example, the baseplate 60 may include a nonferrous material.

A rotor arm 30 is rotatably mounted to the axle 20 to suspend the rotor arm 30 at a distance $d_0$ above the upper surface 12 of the ring magnet 10. The rotor arm 30 may have a generally planar rectangular shape that extends radially outward from the longitudinal axis of the axle 20 so the rotor arm 30 is generally parallel to the upper surface 12 of the ring magnet 10 when the axle 20 is disposed along the central axis L of the ring magnet 10, FIG. 1. Like the baseplate 60, the rotor arm 30 should be constructed of a material that does not interfere with the magnetic properties of the ring magnet 10. The rotor arm 30 may be configured with a mounting hole that is disposed at a midpoint along the length of the rotor arm 30 to receive the axle 20. In such a configuration opposing ends of the rotor arm 30 extend an equal distance radially outward from the axle 20. The rotor arm 30 may be rotatably mounted to the axle 20 via a spindle assembly 50. The spindle assembly 50 includes a spindle housing 54 to which the rotor arm 30 may be affixed. Radial bearings 52, e.g., steel ceramic, or composite material, may be provided within the spindle housing 54 at opposing longitudinal ends of the spindle housing 54. The radial bearings 52 each include a central aperture through which the axle 20 passes to provide a point of attachment, such as a slip-fit, of the radial bearings 52 to the axle 20. The outer surface of the radial bearings 52 is in turn attached to the spindle housing 54 to allow the spindle housing 54 to freely rotate about the axle 20 on the radial bearings 52. Though one specific configuration for rotatably mounting the rotor arm 30 to the axle 20 is illustrated in the form of a spindle assembly 50, it is understood that any suitable structure that permits the rotor arm 30 to rotate sufficiently freely about the axle 20 in response to the axle tilt described below may be used. For example, the rotor arm 30 may be mounted to the axle 20 with a composite or alloy bushing material.

The rotor arm 30 includes at least one rotor magnet 40, which may be provided in the form of a permanent disk magnet comprising any of the compositions noted above as being suitable for use with the ring magnet 10. Alternatively, the rotor magnet 40 may be an electromagnet. The rotor magnet 40 may be mounted proximate one end of the rotor arm 30, such as at a distance of $\frac{3}{4} R_1$ from the axle 20, by any suitable means, FIGS. 1, 2. For example, a hole 32 may be provided in the rotor arm 30 and the rotor magnet 40 may be press-fit or slip-fit with a retaining collar into the hole 32 of the rotor arm 30. Alternatively, the rotor magnet 40 may be adhered to the rotor arm 30 by any suitable means such as by an epoxy. The magnetic poles of the rotor magnet 40 may be oriented so that the rotor magnet 40 is either attracted to or repelled from the ring magnet 10 so as to cause the end of the rotor arm 30 at which the rotor magnet 40 is mounted to be drawn towards or pushed away from the ring magnet 10, respectively. Likewise, a lower planar surface of the rotor magnet 40 may be oriented parallel to a lower planar surface of the rotor arm 30.

A tilt actuator 70 is attached to the proximal end 24 of the axle 20 via a linkage 72 to control the location of the proximal end 24 of the axle 20. The tilt actuator 70 and linkage 72 may be provided in the form of a piston or cam assembly or any other structure suitable for controlling the location of the proximal end 24 of the axle 20 as described below. As illustrated in FIG. 1, in an initial position, the proximal end 24 of the axle 20 may be disposed along the central axis L of the ring magnet 10 in line with the pivotally mounted distal axle end 22. In such an arrangement, the rotor arm 30 may be parallel to the upper surface 12 of the ring magnet 10 and the magnetic forces between the rotor magnet 40 and the ring magnet 10 will be rotationally symmetric about the axle 20 so the rotor arm 30 will not have a preferential direction of rotation about the axle 20. However, by displacing the proximal end 24 of the axle 20 using the tilt actuator 70, the axle 20 may be tilted out of line with the central axis L in such a manner as to create a preferred direction of rotation of the rotor arm 30 about the axle 20 due to the interaction between the rotor magnet 40 and ring magnet 10.

Figure 3A:
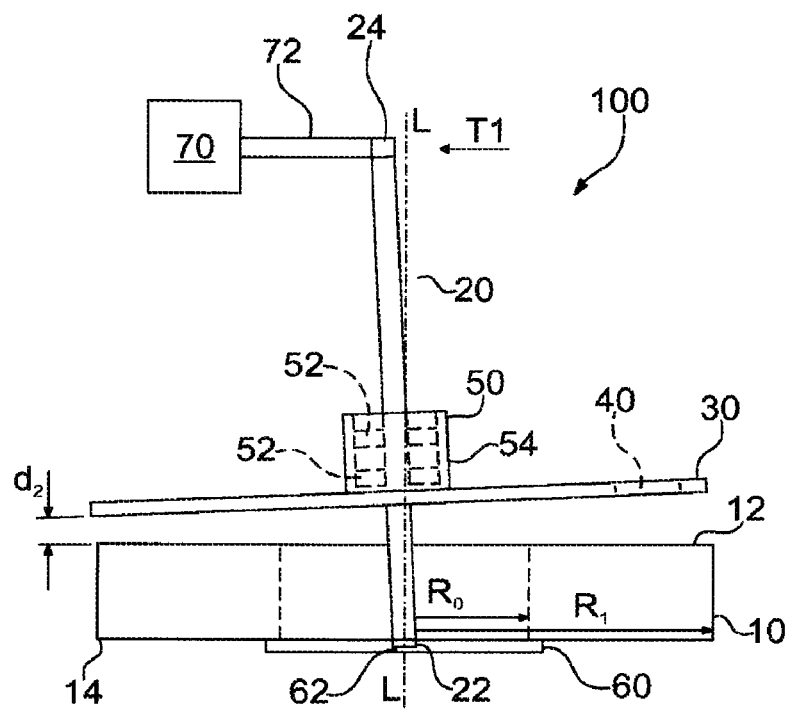
FIG. 3A schematically illustrates a side elevational view of the rotary motor of FIG. 1, but with the axle tilted off-perpendicular relative to an upper surface of the base magnet to induce rotational motion of the rotor arm.

Specifically, with reference to FIGS. 3 and 4, introduction of rotational motion to the rotor arm 30 in response to a tilt of the axle 20 is illustrated to demonstrate the rotational motion associated with the rotary motor 100 of the present invention. In the exemplary configuration illustrated in FIGS. 3 and 4, the rotor magnet 40 is oriented so as to be attracted to the ring magnet 10. Beginning with FIG. 3A, the tilt actuator 70 may be actuated to tilt the axle 20 in the direction T1 resulting in an displacement of the proximal end 24 of the axle 20 from its location A0 on the central axis L to a displaced location $A_1$ to the left, FIG. 4A. As illustrated in FIG. 4A, the initial locations of the rotor arm 30 and distal axle end 24 corresponding to the locations illustrated in FIG. 1 are shown in phantom lines. The location after tilt of the axle 20 is indicated in FIG. 3A by the solid lines. A suitable tilt for use with the rotary motor 100 of the present invention includes a displacement (from $A_0$ to $A_1$) of the proximal axle end 24 by 60 mils for an axle 20 having a length of 14 inches, that is a tilt of 0.245 degrees or 14.73 arc-minutes. Tilt of the axle 20 also results in a corresponding tilt of the rotor arm 30, so that the rotor arm 30 is no longer disposed parallel to the upper surface 12 of the ring magnet 10, FIG. 3A.

Figure 4A:
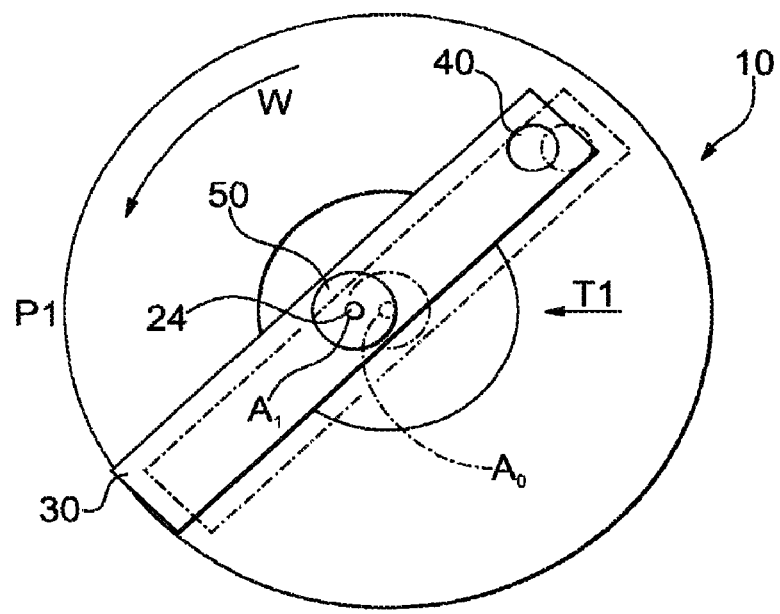
FIG. 4A schematically illustrates a top view of the rotary motor of FIG. 1 showing the displacement of the proximal end of the axle due to the tilt illustrated in FIG. 3A and illustrates the direction of rotation of the rotor arm in response to the axle tilt.
Figure 4B:
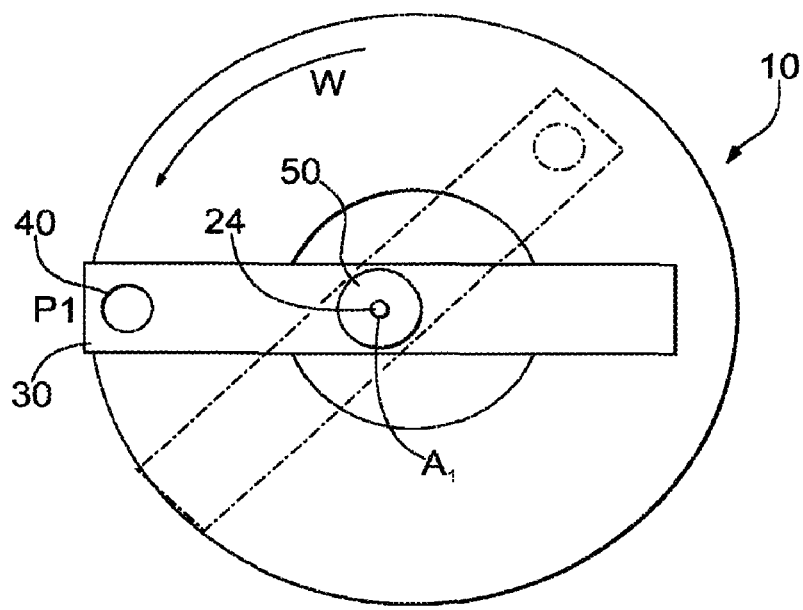
FIG. 4B schematically illustrates a top view of the rotary motor of FIG. 1 showing rotation of the rotor arm in response to the axle tilt illustrated in FIG. 3A.

Since the direction of tilt T1 is directed towards the "nine o'clock" position on the ring magnet 10, P1, as viewed from above, the nine o'clock position P1 represents the location on the ring magnet 10 of least separation, $d_2$, between the rotor magnet 40 and the ring magnet 10. Since for purposes of illustration it has been assumed that the rotor magnet 40 and ring magnet 10 are oriented to attract one another, the rotor magnet 40 will travel towards the location P1 along the direction in which the rotor magnet 40 is constantly getting closer to the ring magnet 10, i.e., in a counterclockwise direction, w, as shown in FIG. 4A. Thus, tilting of the axle 20 as illustrated in FIG. 3A, results in the rotor arm 30 rotating in a counterclockwise direction so that the rotor magnet 40 is disposed at location P1, FIG. 4B. Were the axle 22 to remain tilted with the proximal axle end 24 at the location $A_1$, or if the attractive force between the rotor magnet 40 and the ring magnet 10 were sufficiently strong compared to the angular momentum of the moving rotor arm 30, the rotor arm 30 would come to rest at location P1.

Figure 4C:
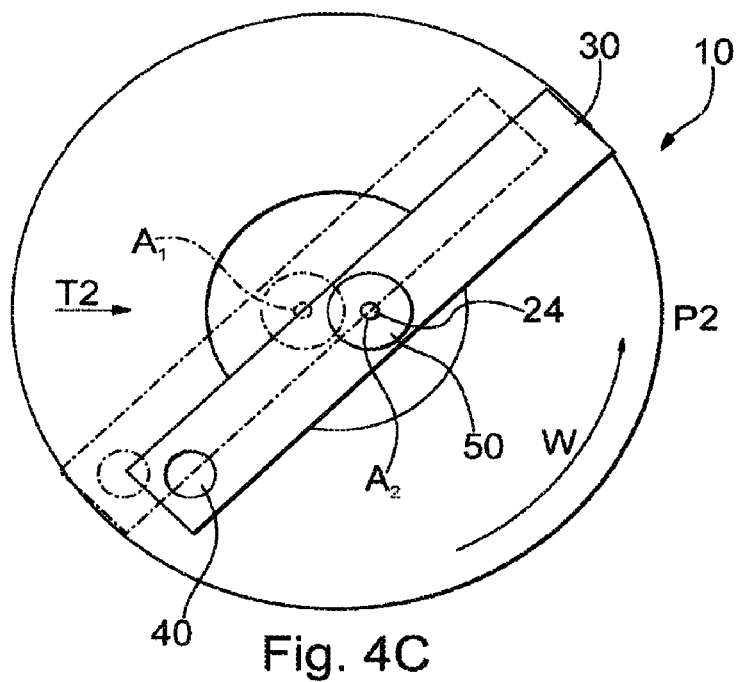
FIG. 4C schematically illustrates a top view of the rotary motor of FIG. 1 and showing the displacement of the proximal end of the axle due to the tilt illustrated in FIG. 3B and illustrates the direction of rotation of the rotor arm in response to the axle tilt.
Figure 4D:
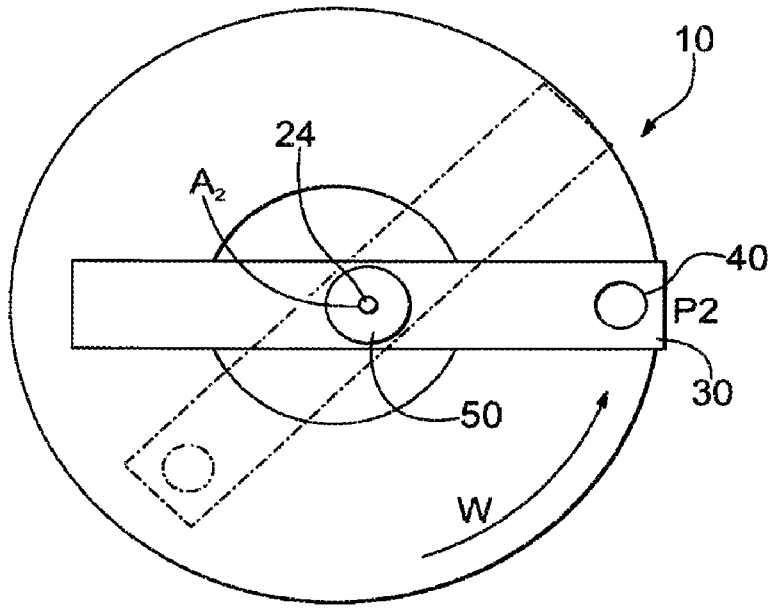
FIG. 4D schematically illustrates a top view of the rotary motor of FIG. 1 showing rotation of the rotor arm in response to the axle tilt illustrated in FIG. 3B.

However, by utilizing radial bearings 52 having a sufficiently low friction compared to the angular momentum of the rotor arm 30 (which depends in part on the relative strengths of the rotor magnet 40 and ring magnet 10), the rotor arm 30 may rotate past the location P1 due to the angular momentum of the rotor arm 30 as is illustrated by the phantom lines shown in FIG. 4C. In this regard, the radial bearings 52 may comprise ABEC grade 2 or equivalent.

Figure 3B:
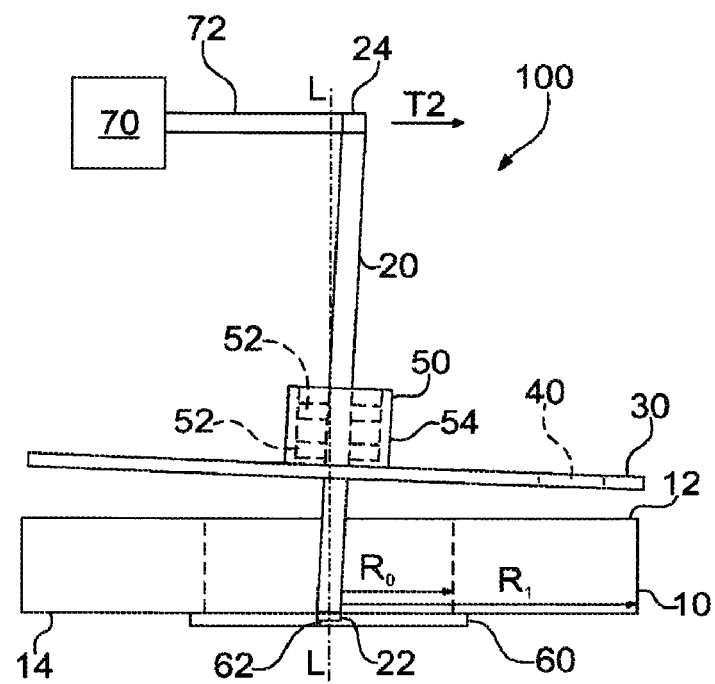
FIG. 3B schematically illustrates a side elevational view of the rotary motor of FIG. 1, but with the axle tilted in an opposite direction to the tilt illustrated in FIG. 3A.

To encourage the rotor arm 30 to continue rotating in the counterclockwise direction w, the tilt actuator 70 may be actuated as the rotor arm 30 approaches or moves past P1 to move the proximal axle end 24 in the opposite direction from which it was originally moved to location $A_2$, along the direction T2 as shown in FIGS. 3B and 4C towards the three o'clock position, P2. In this configuration, the three o'clock position P2 now represents the location on the ring magnet 10 of least separation between the rotor magnet 40 and the ring magnet 10. As before, the rotor magnet 40 will travel towards the location P2 along the direction in which the rotor magnet 40 is constantly getting closer to the ring magnet 10, i.e., in a counterclockwise direction, w, FIG. 4A. Thus, tilting of the axle 20 as illustrated in FIG. 3B, results in the rotor arm 30 rotating in a counterclockwise direction so that the rotor magnet 40 is disposed at location P2, FIG. 4D. Again, the angular momentum of the rotor arm 30 will carry it past the location P2 at which point the tilt actuator 70 may be actuated again to tilt the axle 20 in the opposite direction corresponding, for example, to the location shown in FIG. 3A to cause the rotor arm 30 to continue traveling in a counterclockwise direction towards location P1. Thus, the axle 20 may be tilted back and forth by action of the tilt actuator 70 in time relative to the rotational speed of the rotor arm 30 so that the rotor arm 30 may continue to rotate in a counterclockwise direction. Consequently, the attractive force between the rotor magnet 40 and ring magnet 10 working in concert with tilt of the axle 20 effects rotational motion of the rotor arm 30 to provide a rotary motor 100 in accordance with the present invention.

Figure 5:
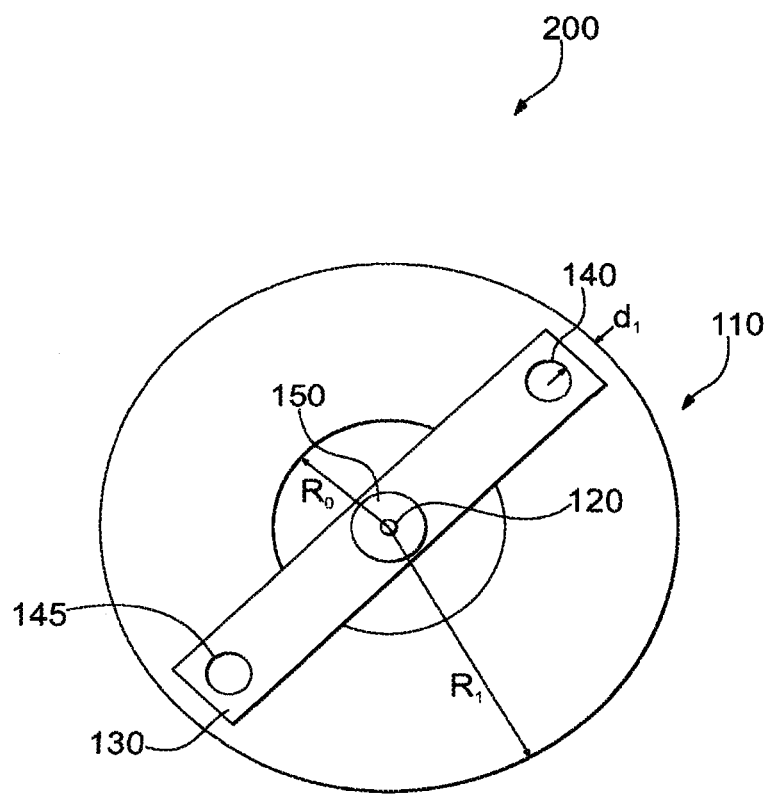
FIG. 5 schematically illustrates a top view of the rotary motor of similar to that of FIGS. 1 and 2 but having a rotor magnet mounted at each end of the rotor arm.

In addition to the rotary motor configuration illustrated in FIGS. 1-4, the present invention also provides a rotary motor configuration in which the rotor arm 130 includes two rotor magnets 140, 145, but in all other respects may be identical to the configuration illustrated in FIG. 1. That is, the rotary motor 200, FIG. 5, may include a ring magnet 110, an axle 120, a rotor arm 130, a spindle assembly 150, and a tilt actuator all of which may be assembled in the same manner as the configuration of FIG. 1. However, the rotor arm 130 of the configuration of FIG. 5 may include a second rotor magnet 145 disposed at an end of the rotor arm 130 opposite to the end of the rotor arm 130 at which the first rotor magnet 140 is positioned. The first and second rotor magnets 140, 145 maybe oriented relative to the ring magnet 110 such that one of the rotor magnets 140 is attracted to the ring magnet 110 and the other of the rotor magnets 145 is repelled by the ring magnet 110.

Further, the present invention also provides a rotary motor configuration in which the rotor arm 230 extends beyond the diameter of the ring magnet 210 and includes counterweights 280, 282 disposed at the ends of the rotor arm 230 below the rotor arm 230 to increase the moment of inertia of the rotor arm 230, FIG. 6, but in all other respects may be identical to the configuration illustrated in FIG. 1. That is, the rotary motor 300 may include a ring magnet 210, an axle 220, a rotor arm 230, a spindle assembly 250, a baseplate 260, a tilt actuator 270, and a linkage 272 all of which may be assembled in the same manner as the configuration of FIG. 1. However, the rotor arm 230 of the configuration of FIG. 6 may have a length greater than the diameter of the ring magnet 210 and may extend beyond the periphery of the ring magnet 210. A counterweight 280, 282 may be provided at each end of the rotor arm 230 that extends below the rotor arm proximate the ring magnet 210 to increase the moment of inertia, and consequently angular momentum of the rotor arm 230 upon rotation. The counterweights 280, 282 may comprise brass, aluminum, or any non-ferrous material. Alternatively or additionally, one or both of the counterweights 280, 282 may take the form of a magnet, such as a cube magnet, that is oriented to be repelled by or attracted to the ring magnet 210.

Figure 6:
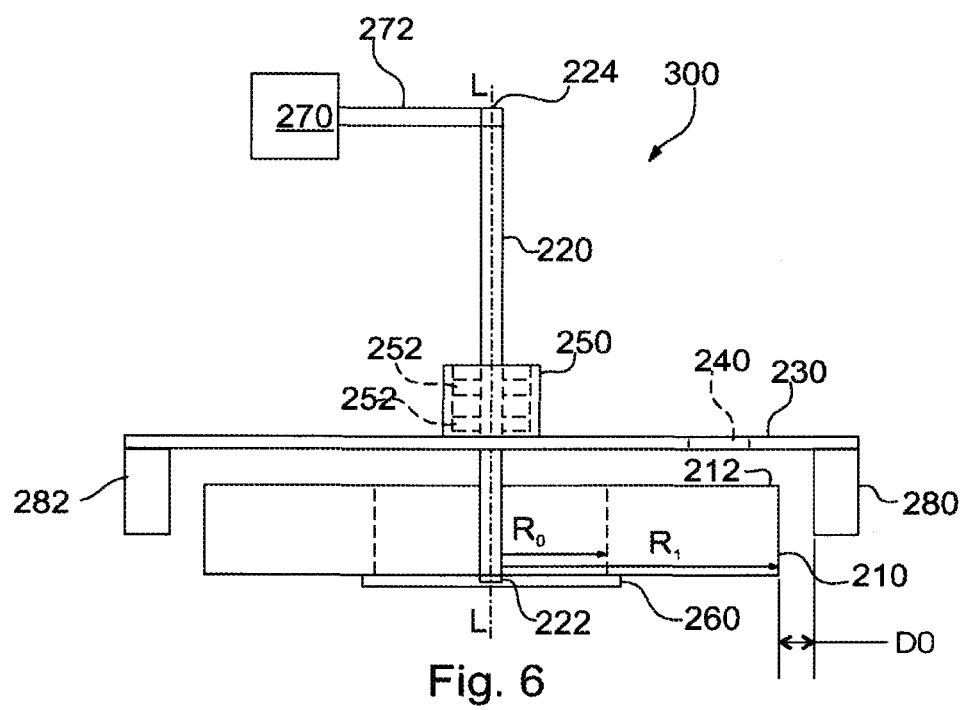
FIG. 6 schematically illustrates a side elevational view of another exemplary configuration of a rotary motor in accordance with the present invention having counterweights mounted below the rotor arm.
Figure 7A:
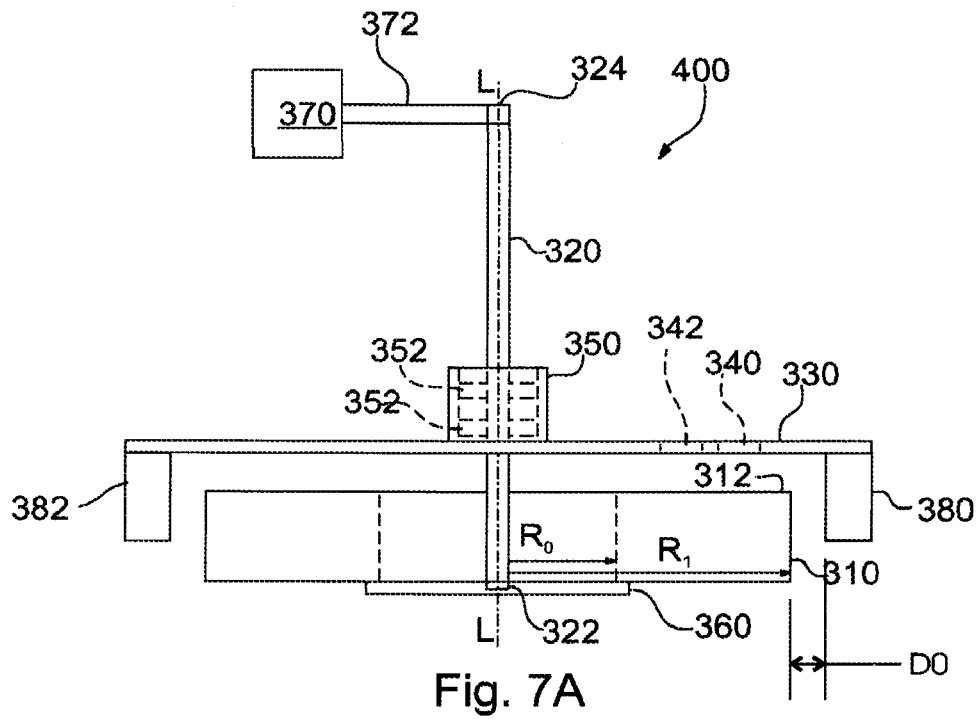
FIGS. 7A and 7B schematically illustrate a side elevational view and top view, respectively, of another exemplary configuration of a rotary motor in accordance with the present invention having two rotor magnets mounted at a first end of the rotor arm.
Figure 7B:
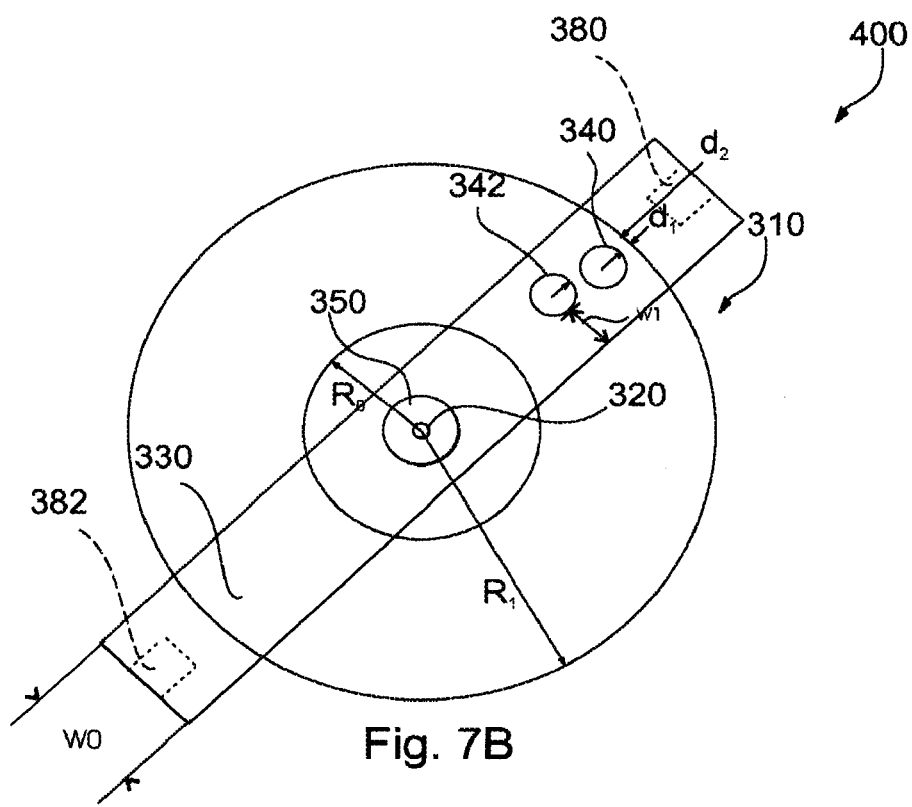

Still further, the present invention also provides a rotary motor 400 similar to that shown in FIG. 6 but having two rotor magnets 340, 342 disposed at a first end of the rotor arm 330, FIGS. 7A, 7B. In all other respects the rotary motor 400 may be identical to the configuration illustrated in FIG. 6. That is, the rotary motor 400 may include a ring magnet 310, an axle 320, a rotor arm 330, a spindle assembly 350, a baseplate 360, a tilt actuator 370, counterweights 380, 382, and a linkage 372 all of which may be assembled in the same manner as the configuration of FIG. 6. However, the rotor arm 330 may include two or more rotor magnets 340, 342 disposed at one end of the rotor arm 330. The rotor magnets 340, 342 may be positioned so that the respective magnetic poles are oriented in opposite directions, with one of the rotor magnets 340, 342 being attracted to the ring magnet 310 and the other being repelled by the ring magnet 310. Alternatively, both rotor magnets 340, 342 may be oriented with the same magnetic polarity. A first of the rotor magnets 340 may be located a distance $d_1$ from the outer edge of the ring magnet 310 and the second rotor magnet 342 may be located a relatively greater distance $d_2$ from outer edge of the ring magnet 310. In addition, the first rotor magnet 340 may be located with its center along the longitudinal axis of the rotor arm 340, and the second rotor magnet 342 may be oriented off-center at a distance $W_1$ from the edge of the rotor arm 330.

EXAMPLES

Example 1

A rotary motor 300 of the type illustrated in FIG. 6 was fabricated according to the following parameters. The ring magnet 210 was provided in the form of an axially magnetized ceramic ring magnet, grade 8, having an inner radius, $R_0$, of 2.17 inches (ID 4.34 inches), and outer radius, $R_1$, of 3.935 inches (OD 7.87 inches), and a thickness of 0.79 inches. (Applied Magnetics, Plano Tex.) The rotor magnet 240 comprised an axially magnetized N42 neodymium rare earth disk magnet having a diameter of 0.75 inches and thickness of 0.125 inches. (Part #DC2, K&J Magnetics, Inc., Jamison Pa.) The rotor arm 230 was 12 inches long, 0.25 inches thick, and comprised aluminum. The rotor magnet 240 was placed at a location on the rotor arm 230 so that the rotor magnet 240 was located 0.125 inches, $d_1$, FIG. 2 inward from the outer edge of the ring magnet 210, though distances $d_1$ as far as 0.385 inches in from the outer edge of the ring magnet 210 are believed to work as well. The distance between the bottom face of the rotor magnet 240 and the upper surface 212 of the ring magnet 210 was 0.5 inches. Distances as large as 1.25 inches are believed to be acceptable. The first counterweight 280 was provided in the shape of a 0.5 inches cube that comprised brass weighing 7 oz, and the second counterweight 282 comprised an axially magnetized N45 neodymium rare earth 0.5 inch cube magnet weighing 7 oz. and oriented to be repelled by the ring magnet 210. (Applied Magnetics, Plano Tex.) The counterweights 280, 282 were spaced 0.385 inches from the edge of the ring magnet 210, D0, FIG. 6.

The axle 220 was 14 inches long and comprised a ¼ inch diameter C30 precision ground steel shaft, oil hardened. (Part #8893k36. McMaster-Carr, Elmhurst Ill.) The radial bearings 252 were shielded chrome steel. (Part #696Z, NSK, Inc., Ann Arbor Mich., www.nsk.com.) The base plate 260 comprised aluminum machined to fit the inner diameter of the ring magnet to provide a fixed position for the distal end 222 of the axle 220. The action of the tilt actuator 270 for purposes of the experimental prototype was provided by grasping the proximal end 224 of the axle 220 and tilting it back and forth by hand. However, it is understood that this function could be provided by a motor comprising a piston or suitable assembly.

Example 2

A rotary motor 400 of the type illustrated in FIG. 7 was fabricated according to the following parameters. The ring magnet 310 was provided in the form of an axially magnetized ceramic ring magnet, grade 8, having an inner radius, $R_0$, of 2.17 inches (ID 4.34 inches), and outer radius, $R_1$, of 3.935 inches (OD 7.87 inches), and a thickness of 0.79 inches. (Applied Magnetics, Plano Tex.) The rotor magnets 340, 342 each comprised an axially magnetized N42 neodymium rare earth disk magnet having a diameter of 0.75 inches and thickness of 0.125 inches. (Part #DC2, K&J Magnetics, Inc., Jamison Pa.) The rotor magnets 340, 342 were oriented with their magnetic polarities in opposite directions to one another, with the outer magnet 340 disposed to that it was repelled by the ring magnet 310. The rotor arm 330 was 12 inches long, 0.25 inches thick, 1 inch wide (W0), and comprised aluminum. The outer rotor magnet 340 was placed at a location on the rotor arm 330 so that the rotor magnet 340 was located 0.125 inches, $d_1$, inward from the outer edge of the ring magnet 310, FIG. 7B. The inner rotor magnet 342 was placed at a location on the rotor arm 330 so that the inner rotor magnet 342 was located 0.385 inches, $d_2$, inward from the outer edge of the ring magnet 310 and 0.155 inches, W1, inward from the longitudinal edge (i.e., 30 mil off-center) of the rotor arm 330, FIG. 7B. The distance between the bottom face of the rotor magnet 340 and the upper surface 312 of the ring magnet 310 was 0.5 inches. Distances as large as 1.25 inches are believed to be acceptable. The first counterweight 380 was provided in the shape of a 0.5 inches cube that comprised brass weighing 7 oz, and the second counterweight 382 comprised an axially magnetized N45 neodymium rare earth 0.5 inch cube magnet weighing 7 oz. and oriented to be repelled by the ring magnet 310. (Applied Magnetics, Plano Tex.) The counterweights 280, 282 were spaced 0.385 inches from the edge of the ring magnet 310, D0, FIG. 7A.

The axle 320 was 14 inches long and comprised a ¼ inch diameter C30 precision ground steel shaft, oil hardened. (Part #8893k36. McMaster-Carr, Elmhurst Ill.) The radial bearings 352 were shielded chrome steel. (Part #696Z, NSK, Inc., Ann Arbor Mich., www.nsk.com.) The base plate 360 comprised aluminum machined to fit the inner diameter of the ring magnet to provide a fixed position for the distal end 322 of the axle 320. The action of the tilt actuator 370 for purposes of the experimental prototype was provided by grasping the proximal end 324 of the axle 320 and tilting it back and forth by hand. However, it is understood that this function could be provided by a motor comprising a piston or suitable assembly.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A rotary motor comprising:
   a. a ring magnet having an upper surface;
   b. at least one rotor arm disposed generally parallel to the upper surface of the ring magnet in magnetic communication with the ring magnet, and wherein the at least one rotor arm is configured to rotate about an axis of rotation substantially perpendicular to the upper surface of the ring magnet; and
   c. a tilt actuator configured to tilt the axis of rotation and the at least one rotor arm relative to the ring magnet to orient the at least one rotor arm and the upper surface of the ring magnet out of parallel with one another,
   whereby the tilt actuator and the magnetic communication between the at least one rotor arm and ring magnet cooperate to effect rotational movement of the at least one rotor arm about the axis of rotation.

2. The rotary motor according to claim 1, wherein the at least one rotor arm comprises at least one rotor magnet.

3. The rotary motor according to claim 2, wherein the at least one rotor magnet is oriented to the ring magnet to be attracted to the ring magnet.

4. The rotary motor according to claim 2, wherein the at least one rotor magnet is oriented to the ring magnet to be repelled by the ring magnet.

5. The rotary motor according to claim 2, wherein the at least one rotor magnet comprises a disk magnet.

6. The rotary motor according to claim 2, wherein the at least one rotor magnet comprises a permanent magnet or an electromagnet.

7. The rotary motor according to claim 2, wherein the at least one rotor magnet comprises two rotor magnets.

8. The rotary motor according to claim 1, wherein the ring magnet comprises samarium-cobalt, aluminum-nickel-cobalt, neodymium-iron-boron, ceramic, or ferrous materials.

9. The rotary motor according to claim 1, wherein the ring magnet is an electromagnet.

10. The rotary motor according to claim 1, wherein the at least one rotor arm is configured to be attracted to the ring magnet.

11. The rotary motor according to claim 1, wherein the at least one rotor arm is configured to be repelled by the ring magnet.

12. The rotary motor according to claim 1, wherein the at least one rotor arm comprises at least one counterweight.

13. The rotary motor according to claim 12, wherein at least one the rotor arm has a length that is greater than the diameter of the ring magnet and the counterweight is disposed proximate an end of the at least one rotor arm.

14. The rotary motor according to claim 13, wherein the at least one counterweight comprises a magnetic, brass, aluminum, or non-ferrous material.

15. The rotary motor according to claim 12, wherein the at least one counterweight comprises a magnetic, brass, aluminum, or non-ferrous material.

* * * * *